(12) United States Patent
Liu et al.

(10) Patent No.: US 11,649,790 B1
(45) Date of Patent: May 16, 2023

(54) CONTROL METHOD AND APPARATUS APPLIED TO CONTROLLER

(71) Applicant: WEICHAI POWER CO., LTD., Shandong (CN)

(72) Inventors: Haijun Liu, Shandong (CN); Jixuan Huang, Shangdong (CN); Ninglu Wang, Shandong (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/892,979

(22) Filed: Aug. 22, 2022

(30) Foreign Application Priority Data

Mar. 21, 2022 (CN) .......................... 202210276937.6

(51) Int. Cl.
| | | |
|---|---|---|
| *F02M 31/13* | (2006.01) | |
| *F02M 31/135* | (2006.01) | |
| *F02M 31/12* | (2006.01) | |
| *F02N 19/04* | (2010.01) | |
| *F02N 19/06* | (2010.01) | |

(52) U.S. Cl.
CPC ............ *F02M 31/13* (2013.01); *F02M 31/12* (2013.01); *F02M 31/135* (2013.01); *F02N 19/04* (2013.01); *F02N 19/06* (2013.01); *F02N 2300/10* (2013.01); *F02N 2300/20* (2013.01); *F02N 2300/304* (2013.01)

(58) Field of Classification Search
CPC ....... F02M 31/12; F02M 31/13; F02M 31/135
See application file for complete search history.

(56) References Cited

U.S. PATENT DOCUMENTS

| | | | | | |
|---|---|---|---|---|---|
| 2,251,630 | A | * | 8/1941 | Loeffler | ................. F02M 31/04 219/206 |
| 3,851,278 | A | * | 11/1974 | Isono | ................ H02M 7/53846 363/133 |
| 3,866,587 | A | * | 2/1975 | Knapp | ................. F02M 31/125 123/549 |
| 3,934,567 | A | * | 1/1976 | Fujieda | .................. F02M 31/13 123/547 |

(Continued)

FOREIGN PATENT DOCUMENTS

| | | | | |
|---|---|---|---|---|
| BR | 102015006123 A2 | * | 12/2015 | ........... F02M 31/125 |
| CN | 101069010 A | * | 11/2007 | ............. F02M 31/13 |

(Continued)

*Primary Examiner* — Kevin R Steckbauer
(74) *Attorney, Agent, or Firm* — Fenwick & West LLP

(57) ABSTRACT

A control method and a control apparatus are provided. A main control circuit board in a controller receives an initial control command via a CAN bus from an ECU after being powered on, controls a fault detection circuit board to detect initial states of the controller and all devices connected to the controller based on the initial control command to obtain initial state information, transmits the initial state information to the ECU via the CAN bus, receives a first target control command via the CAN bus from the ECU, and controls a conduction control circuit board to turn on at least one MOS in a MOS array based on the first target control command to output a control signal to a heater connected to the controller to control the heater to operate, thereby realizing a closed-loop control on the heater and adjusting a power of the heater at any time.

12 Claims, 5 Drawing Sheets

(56) References Cited

U.S. PATENT DOCUMENTS

| | | | | |
|---|---|---|---|---|
| 4,034,204 A * | 7/1977 | Windsor | B60H 1/00457 | 219/202 |
| 4,091,265 A * | 5/1978 | Richards | F02M 31/125 | 219/205 |
| 4,122,679 A * | 10/1978 | Charron | F02D 21/08 | 60/599 |
| 4,345,141 A * | 8/1982 | Little | F02M 31/125 | 219/205 |
| 4,372,261 A * | 2/1983 | Sarto | F02N 19/04 | 123/549 |
| 4,512,324 A * | 4/1985 | Neary | F02M 31/125 | 123/549 |
| 4,545,357 A * | 10/1985 | Kearsley | F02M 31/06 | 123/556 |
| 4,667,645 A * | 5/1987 | Gluckman | F02M 31/042 | 123/179.8 |
| 4,818,842 A * | 4/1989 | Walty | F28F 13/003 | 123/549 |
| 4,944,260 A * | 7/1990 | Shea | F02D 41/18 | 123/179.21 |
| 5,094,198 A * | 3/1992 | Trotta | F02M 31/13 | 123/179.21 |
| 5,186,045 A * | 2/1993 | Matsuoka | G01F 1/72 | 73/114.34 |
| 5,334,818 A * | 8/1994 | Edwards | F24H 3/0405 | 392/347 |
| 5,347,966 A * | 9/1994 | Mahon | F02N 19/06 | 123/179.21 |
| 5,350,114 A * | 9/1994 | Nelson | F23N 5/203 | 123/142.5 R |
| 5,482,013 A * | 1/1996 | Andrews | F02N 19/06 | 219/206 |
| 5,632,917 A * | 5/1997 | Cummins | H05B 1/0236 | 219/202 |
| 5,634,443 A * | 6/1997 | Mathews | F02P 19/027 | 123/179.21 |
| 5,743,242 A * | 4/1998 | Thimmesch | F02M 31/13 | 123/549 |
| 5,887,575 A * | 3/1999 | Thimmesch | H05B 3/32 | 123/549 |
| 5,922,232 A * | 7/1999 | Merz | B60N 2/5685 | 219/505 |
| 5,988,146 A * | 11/1999 | Anderson | F02M 31/13 | 123/549 |
| 5,990,459 A * | 11/1999 | Feustel | B60H 1/2221 | 219/486 |
| 5,992,399 A * | 11/1999 | Anderson | F28F 9/0234 | 123/549 |
| 6,031,204 A * | 2/2000 | Prust | F02N 19/06 | 123/549 |
| 6,040,557 A * | 3/2000 | Prust | F02N 19/06 | 123/549 |
| 6,073,615 A * | 6/2000 | Anderson | F28F 9/0234 | 123/549 |
| 6,084,218 A * | 7/2000 | McDonough | F24H 9/2014 | 219/508 |
| 6,085,519 A * | 7/2000 | Prior | F01N 3/38 | 123/549 |
| 6,109,247 A * | 8/2000 | Hunt | F02M 31/135 | 123/549 |
| 6,119,665 A * | 9/2000 | Anderson | F02M 31/042 | 123/549 |
| 6,138,645 A * | 10/2000 | Joppig | F02N 19/06 | 123/179.21 |
| 6,152,117 A * | 11/2000 | Prust | F02M 31/13 | 123/556 |
| 6,242,712 B1 * | 6/2001 | Prust | F02M 31/13 | 123/549 |
| 6,354,256 B1 * | 3/2002 | Ohanian | F02M 31/125 | 123/549 |
| 6,359,424 B2 * | 3/2002 | Iida | H03K 3/57 | 323/251 |
| 6,392,207 B2 * | 5/2002 | Beetz | B60H 1/2218 | 219/202 |
| 6,477,047 B1 * | 11/2002 | Markwardt | H01L 23/34 | 257/713 |
| 6,635,851 B2 * | 10/2003 | Uhl | F02P 19/025 | 219/544 |
| 6,651,632 B2 * | 11/2003 | Thimmesch | F02M 31/135 | 123/549 |
| 6,700,105 B2 * | 3/2004 | Morrison | H05B 6/04 | 123/549 |
| 6,712,032 B2 * | 3/2004 | Uhl | F02P 19/025 | 123/145 A |
| 6,715,472 B2 * | 4/2004 | Stephan | F02M 31/13 | 123/549 |
| 6,736,098 B2 * | 5/2004 | Toedter | F02D 41/266 | 123/145 A |
| 6,807,041 B2 * | 10/2004 | Geiger | H05K 7/20472 | 361/103 |
| 6,810,203 B2 * | 10/2004 | Alban | F24H 9/2071 | 392/347 |
| 6,843,218 B2 * | 1/2005 | Kumada | F02P 19/025 | 123/145 A |
| 6,872,922 B2 * | 3/2005 | Uhl | F24H 9/2071 | 219/483 |
| 6,875,960 B2 * | 4/2005 | Yamaguchi | H01L 21/67103 | 219/544 |
| 6,906,288 B2 * | 6/2005 | Toedter | F02P 19/025 | 123/145 A |
| 6,911,630 B2 * | 6/2005 | Neckel | H05B 3/141 | 219/505 |
| 6,928,992 B1 * | 8/2005 | Holmes | F02M 31/0825 | 123/498 |
| 6,964,269 B2 * | 11/2005 | Gschwind | F02M 31/13 | 123/549 |
| 7,002,106 B2 * | 2/2006 | Toedter | F02P 19/025 | 123/145 A |
| 7,044,115 B2 * | 5/2006 | Gschwind | F02M 31/13 | 123/556 |
| 7,190,893 B2 * | 3/2007 | Kuebler | F24H 1/121 | 392/494 |
| 7,305,178 B2 * | 12/2007 | Haubold | F02M 31/125 | 392/447 |
| 7,472,695 B2 * | 1/2009 | Prust | F02M 31/13 | 123/549 |
| 7,681,558 B2 * | 3/2010 | Gale | F02D 41/20 | 123/549 |
| 8,003,922 B2 * | 8/2011 | Seger | H05B 1/0236 | 219/205 |
| 8,255,091 B2 * | 8/2012 | Hsieh | G05D 23/1909 | 219/494 |
| 8,263,911 B2 * | 9/2012 | Yen | G06F 1/20 | 219/490 |
| 8,405,007 B2 * | 3/2013 | Eller | F02M 31/13 | 219/520 |
| 8,432,650 B2 * | 4/2013 | Seger | H01H 9/547 | 361/54 |
| 8,548,641 B2 * | 10/2013 | Nakata | H02M 3/156 | 701/1 |
| 8,707,923 B2 * | 4/2014 | Vigild | F02M 31/13 | 123/179.21 |
| 8,960,166 B2 * | 2/2015 | Styles | F02M 31/042 | 123/552 |
| 8,981,264 B2 * | 3/2015 | Seger | F02M 31/13 | 123/549 |
| 9,046,899 B2 * | 6/2015 | Shearer | G05D 23/24 | |
| 9,226,340 B2 * | 12/2015 | Maemura | B60H 1/2221 | |
| 9,250,156 B2 * | 2/2016 | Nethercutt | G07C 5/0808 | |
| 9,263,778 B2 * | 2/2016 | Han | B60L 1/02 | |
| 9,271,332 B2 * | 2/2016 | Maemura | H05B 1/0236 | |
| 9,327,579 B2 * | 5/2016 | Eisenhour | F02M 35/1038 | |
| 9,528,723 B2 * | 12/2016 | Semyanko | B64D 11/04 | |
| 9,577,526 B2 * | 2/2017 | Chen | H02M 3/158 | |
| 9,587,604 B2 * | 3/2017 | Kabasin | F02M 31/125 | |
| 9,960,009 B2 * | 5/2018 | Rudolph | H01J 37/244 | |
| 10,453,651 B2 * | 10/2019 | Rudolph | H01J 37/244 | |

(56) References Cited

U.S. PATENT DOCUMENTS

| | | | | |
|---|---|---|---|---|
| 2002/0000221 | A1* | 1/2002 | Kilb | F02M 31/13 123/556 |
| 2002/0092492 | A1* | 7/2002 | Ohanian | F02M 31/13 123/179.21 |
| 2002/0092508 | A1* | 7/2002 | Kanekawa | F02M 31/02 123/549 |
| 2003/0029405 | A1* | 2/2003 | Toedter | F02P 19/02 123/145 A |
| 2004/0003800 | A1* | 1/2004 | Gschwind | F02M 31/13 123/549 |
| 2004/0025852 | A1* | 2/2004 | Kanekawa | F02M 31/02 123/549 |
| 2004/0056018 | A1* | 3/2004 | Uhl | F24H 9/2071 219/483 |
| 2004/0126286 | A1* | 7/2004 | deRuyter | F01N 13/009 422/177 |
| 2004/0255889 | A1* | 12/2004 | Kumada | F02P 19/025 123/179.6 |
| 2005/0034449 | A1* | 2/2005 | Frieden | F01N 3/2006 60/284 |
| 2005/0039732 | A1* | 2/2005 | Toedter | F02P 19/025 123/605 |
| 2005/0092727 | A1* | 5/2005 | Fraley | G11B 33/128 |
| 2005/0120789 | A1* | 6/2005 | Matsumoto | G01K 7/20 73/204.15 |
| 2005/0235970 | A1* | 10/2005 | Carretero | F02M 31/13 123/549 |
| 2005/0257781 | A1* | 11/2005 | Linkenhoger | F02M 31/042 123/549 |
| 2006/0098964 | A1* | 5/2006 | Haubold | F02M 31/125 392/447 |
| 2006/0150959 | A1* | 7/2006 | Prust | F02N 19/04 123/549 |
| 2006/0196448 | A1* | 9/2006 | Hayworth | F02M 31/12 122/6.6 |
| 2007/0039596 | A1* | 2/2007 | Navalon Carretero | F02M 35/10019 123/549 |
| 2007/0062497 | A1* | 3/2007 | Joppig | F02M 31/135 123/179.21 |
| 2007/0194008 | A1* | 8/2007 | Seger | F02M 31/13 123/434 |
| 2007/0194009 | A1* | 8/2007 | Seger | H05B 1/0236 123/434 |
| 2008/0060619 | A1* | 3/2008 | Allston | F02M 1/165 123/549 |
| 2009/0126705 | A1* | 5/2009 | Trapasso | H05B 3/20 123/549 |
| 2009/0178651 | A1* | 7/2009 | Gale | F02M 31/125 123/549 |
| 2015/0267671 | A1* | 9/2015 | Kabasin | F02M 31/125 219/498 |

FOREIGN PATENT DOCUMENTS

| | | | | |
|---|---|---|---|---|
| CN | 201047321 | Y | * 4/2008 | F02M 31/13 |
| CN | 101069010 | B | * 12/2010 | F02M 31/13 |
| CN | 106246434 | A | * 12/2016 | B60K 6/48 |
| CN | 108060994 | A | * 5/2018 | |
| CN | 109098893 | A | * 12/2018 | F02M 31/13 |
| CN | 109638775 | A | * 4/2019 | F02M 31/13 |
| CN | 110360030 | A | * 10/2019 | F02M 31/125 |
| CN | 113090431 | A | * 7/2021 | F02B 29/0456 |
| DE | 3045327 | A | * 7/1982 | F02M 15/04 |
| DE | 3829126 | C | * 10/1989 | B01D 35/18 |
| DE | 4314283 | A1 | * 11/1994 | F02M 31/135 |
| DE | 4314283 | C2 | * 4/1995 | F02M 31/135 |
| DE | 19927269 | A1 | * 12/1999 | F02B 29/00 |
| DE | 10119620 | A1 | * 10/2002 | F02M 31/125 |
| DE | 10234561 | A1 | * 2/2004 | F02M 31/125 |
| DE | 102004054625 | A1 | * 5/2006 | F02M 31/125 |
| DE | 102009017322 | A1 | * 10/2010 | F02M 31/125 |
| DE | 102012224181 | A1 | * 6/2014 | F02M 31/125 |
| EP | 1385073 | A2 | * 1/2004 | F02M 31/125 |
| EP | 1505292 | A2 | * 2/2005 | B01D 35/143 |
| EP | 1657425 | A2 | * 5/2006 | F02M 31/125 |
| EP | 1821573 | A2 | * 8/2007 | F02M 31/13 |
| EP | 2362709 | A2 | * 8/2011 | H05B 1/0236 |
| EP | 1385073 | B1 | * 9/2011 | F02M 31/125 |
| EP | 2395226 | A1 | * 12/2011 | F02M 31/13 |
| EP | 2395226 | B1 | * 7/2013 | F02M 31/13 |
| EP | 2362709 | B1 | * 12/2013 | H05B 1/0236 |
| EP | 3249207 | A2 | * 11/2017 | F02M 31/13 |
| GB | 1423855 | A | * 2/1976 | F02M 31/125 |
| GB | 2076056 | A | * 11/1981 | F02M 31/125 |
| GB | 2100342 | A | * 12/1982 | F02N 19/04 |
| GB | 2116809 | A | * 9/1983 | F02N 19/04 |
| IT | 1152236 | B | * 12/1986 | F02N 19/04 |
| JP | 2016133111 | A | * 7/2016 | F02M 31/125 |
| JP | 6991933 | B2 | * 1/2022 | F02M 31/13 |
| WO | WO-8801345 | A | * 2/1988 | B01D 35/18 |
| WO | WO-02064968 | A1 | * 8/2002 | F02M 31/125 |
| WO | WO-2005012807 | A2 | * 2/2005 | F02M 31/13 |
| WO | WO-2005035967 | A1 | * 4/2005 | F02M 31/13 |
| WO | WO-2006091477 | A2 | * 8/2006 | B60S 1/488 |
| WO | WO-2010119028 | A1 | * 10/2010 | F02M 31/125 |

* cited by examiner

CONTROL METHOD AND APPARATUS APPLIED TO CONTROLLER

The present application claims priority to Chinese Patent Application No. 202210276937.6, titled "CONTROL METHOD AND APPARATUS APPLIED TO CONTROLLER," filed on Mar. 21, 2022 with the Chinese Patent Office, which is incorporated by reference in its entirety.

FIELD

The present disclosure relates to the technical field of automatic control, and in particular to a control method and a control apparatus for a controller.

BACKGROUND

At present, a control system of an engine normally controls a heater by using a relay. The relay turns on or turns off a circuit based on a change of a physical quantity, such as a voltage and a current. In the control of the relay, a large number of mechanical contacts are used, and the opening and closing of the contacts often result in mechanical wear. Long-term usage of the relay results in poor contact of the contacts and decreasing of a return torque of a return spring. In a case that the contacts are closed for a long time, it may results in faults such as contact adhesion and contact fuse, and even a major fault such as vehicle fire. The conventional relay control method is an open-loop control method having an insufficiently precise control strategy, resulting in that the power of the heater cannot be adjusted at any time with the conventional relay control method.

SUMMARY

A control method and a control apparatus for a controller are provided according to the present disclosure to solve the problem that a power of a heater cannot be adjusted at any time with a relay control method according to the conventional technology.

The following technical solutions are provided according to the embodiments of the present disclosure.

A control method is provided according to a first aspect of the present disclosure. The control method is applied to a controller in an engine. The controller includes a main control circuit board, a fault detection circuit board, a field-effect transistor metal-oxide-semiconductor (MOS) array, and a conduction control circuit board for controlling a MOS in the MOS array to be turned on. The control method includes: receiving, by the main control circuit board via a controller area network (CAN) bus, an initial control command from an electronic control unit (ECU) in the engine after the ECU is powered on; controlling, by the main control circuit board based on the initial control command, the fault detection circuit board to detect initial states of the controller and all devices connected to the controller to obtain initial state information, and transmitting, by the main control circuit board via the CAN bus, the initial state information to the ECU; receiving, by the main control circuit board via the CAN bus, a first target control command from the ECU, where the first target control command is transmitted by the ECU after determining that the initial state information indicates that each of the initial states of the controller and all the devices connected to the controller is a preset state; and controlling, by the main control circuit board based on the first target control command, the conduction control circuit board to turn on at least one MOS in the MOS array to output a control signal to a heater connected to the controller to control the heater to operate.

In the method according to the above embodiment, a multi-functional controller is integrated, so that the controller can communicate with the ECU via the CAN bus to adjust a power of the heater at any time or to continuously adjust the power, thereby improving measurement accuracy and control accuracy.

Furthermore, the MOS array is integrated in the controller to realize a failure protection of the controller as a small control system. In this way, the controller is not affected by environment and man-made influence, achieving high performance, high security, high reliability and high intelligence, and achieving a quick control and a fine-grained control effect.

In an embodiment, the controlling, by the main control circuit board based on the initial control command, the fault detection circuit board to detect initial states of the controller and all devices connected to the controller to obtain initial state information includes: transmitting, by the main control circuit board, the initial control command to the fault detection circuit board; detecting, by the fault detection circuit board after receiving the initial control command, the initial states of the controller and all the devices connected to the controller based on a self-learning detection strategy to obtain the initial state information; and transmitting, by the fault detection circuit board, the initial state information to the main control circuit board.

In the method according to the above embodiment, the fault detection circuit board is integrated in the controller, so that after receiving the initial control command, the main control circuit board accurately detects the initial states of the controller and all devices connected to the controller based on the self-learning detection strategy after the controller is powered on. Thus, the initial state of the small control system including the controller is accurately detected and evaluated after the controller is powered on, and then a device in an abnormal state and/or in a state that does not match the current control command is timely fed back to the ECU, so that ECU outputs fault prompt information in time, thereby reducing the risk of operation of the vehicle with faults, ensuring the safety of the vehicle and improving performance of products in the vehicle.

In an embodiment, after receiving, by the main control circuit board via the CAN bus, the first target control command from the ECU, the control method further includes: transmitting, by the main control circuit board, the first target control command to the fault detection circuit board; after receiving the first target control command, detecting, by the fault detection circuit board based on a self-learning detection strategy, a real-time state of each of the controller and all the devices connected to the controller to determine real-time state information of each of the controller and all the devices connected to the controller, and transmitting, by the fault detection circuit board, the real-time state information of the controller and all the devices connected to the controller to the main control circuit board; and feeding back, by the main control circuit board via the CAN bus, the real-time state information of the controller and all the devices connected to the controller to the ECU.

In the method according to the above embodiment, after receiving the first target control command, the main control circuit board transmits the first target control command to the fault detection circuit board. The fault detection circuit board detects the real-time state information of the controller and the real-time state information of the devices connected to the controller based on the first target control command. Thus, a fault and/or a deviation of the control strategy corresponding to the control command can be found in time, and then the fault and the deviation of the control strategy corresponding to the control command are fed back to the ECU in time. In this way, the ECU can timely output the fault prompt information and/or timely determine a supplementary control strategy based on the deviation to improve the accuracy of the control strategy.

In an embodiment, the controlling, based on the first target control command, the conduction control circuit board to turn on at least one MOS in the MOS array includes: transmitting by the main control circuit board, the first target control command to the conduction control circuit board; and after receiving the first target control command, turning on, by the conduction control circuit board based on the first target control command, at least one MOS in the MOS array. After controlling the conduction control circuit board to turn on at least one MOS in the MOS array, the control method further includes: receiving, by the main control circuit board via the CAN bus, a disconnection control command from the ECU, and transmitting, by the main control circuit board, the disconnection control command to the conduction control circuit board, where the disconnection control command is transmitted by the ECU after determining that an obtained real-time temperature parameter associated with the heater reaches a historical temperature threshold corresponding to a normal start of the engine; and turning off, by the conduction control circuit board after receiving the disconnection control command, the at least one MOS corresponding to the first target control command.

In the method according to the above embodiment, the disconnection control command from the ECU is timely transmitted to the conduction control circuit board. When the real-time temperature parameter associated with the heater reaches the historical temperature threshold corresponding to a normal start of the engine, the disconnection control command is timely transmitted to cut off the power supply of the heater, minimizing a major fault of the vehicle fire caused by overheating of heating harness.

In an embodiment, after turning off the at least one MOS corresponding to the first target control command, the control method further includes: continuously receiving, by the main control circuit board, a second target control command for a target device from the ECU, and controlling, by the main control circuit board based on the second target control command, the conduction control circuit board to turn on a MOS in the MOS array corresponding to the target device to output a control signal to the target device to control the target device to operate, where the target device includes at least one of all the devices connected to the controller, and the second target control command is transmitted by the ECU after outputting a start command to the engine and determining that the engine is normally started.

In the method according to the above embodiment, the controller has the function of multi-channel output. In this way, the controller may simultaneously control multiple devices, thereby reducing the line laying, improving the control system of the vehicle and improving the control accuracy.

In an embodiment, the control method further includes: in a case that the fault detection circuit board determines that one of the controller and the devices connected to the controller is not in the preset state, adding, by the fault detection circuit board, fault alarm information corresponding to the one of the controller and the devices in target state information, and transmitting, by the fault detection circuit board, the target state information to the main control circuit board, where the target state information is one of the initial state information and real-time state information; and transmitting, by the main control circuit board via the CAN bus, the target state information to the ECU. The ECU compares the fault alarm information in the target state information with a fault determination analysis result and outputs alarm prompt information based on a comparison result, and the fault determination analysis result includes the fault alarm information and fault prompt information matching the fault alarm information. The preset state includes at least one of an abnormal state and a state that does not match a current control command received by the controller. The current control command includes one of the initial control command, the first target control command, and the second target control command.

In the method according to the above embodiment, the fault detection circuit board is integrated in the controller, a fault of the small control system including the controller can be timely detected, and then the fault alarm information corresponding to the fault is added to the target state information. The target state information is timely transmitted to the main control circuit board, and then the main control circuit board timely communicates with the ECU via the CAN bus, so that the ECU can timely know the fault of the small control system including the controller. Therefore, the fault prompt information can be timely outputted, reducing the risk of operation of the vehicle with faults and ensuring the safety of the vehicle.

In an embodiment, the self-learning detection strategy includes at least one of: detecting a first temperature of the controller, and determining whether the controller is in the abnormal state based on the first temperature and a historical fault temperature analysis result; for each of MOSs comprised in the controller, determining a current state of the MOS and determining whether the current state of the MOS matches the current control command based on the current state of the MOS; for each of the devices connected to the controller, detecting a second temperature of the device, and determining whether the device is in the abnormal state based on the second temperature of the device and a temperature of the device in the historical fault temperature analysis result; and for each of the devices connected to the controller, detecting a current state of the device after being powered on, and determining whether the current state matches the current control command based on the current state of the device.

In the method according to the above embodiment, with the self-learning detection strategy, the fault detection circuit board can timely detect the states of the controller and the devices connected to the controller, so that the ECU can timely adjust the control strategy to control the powers of the heater and other device at any time, thereby improving the control accuracy and the comprehensiveness of the evaluation of the heating capacity of the heater and the powers of other devices.

A control method is provided according to a second aspect of the present disclosure. The control method is applied to an electronic control unit (ECU) in an engine. The control method includes: obtaining, by the ECU after being powered on, an initial temperature parameter, and transmitting, by the ECU via a controller area network (CAN) bus, an initial control command to a controller in the engine, where the initial temperature parameter includes at least one of an initial ambient temperature, an initial intake air temperature, an initial water temperature and an initial oil temperature; receiving, by the ECU via the CAN bus, initial state information from the controller, and determining, by the ECU after determining that the initial state information indicates that each of initial states of the controller and all devices connected to the controller each is a preset state, a first target control command based on the initial temperature parameter and a controller application analysis result; and transmitting, by the ECU via the CAN bus, the first target control command to the controller, where a main control circuit board in the controller controls a conduction control circuit board in the controller to turn on at least one metal-oxide-semiconductor (MOS) in a MOS array in the controller based on the first target control command, to output a control signal to a heater connected to the controller to control the heater to operate.

In an embodiment, the controller application analysis result includes a first calibration parameter associated with the heater, second calibration parameters associated with other devices, historical data associated with the controller and historical data associated with the heater. The historical data includes a historical temperature threshold and a historical state of the controller or a historical temperature threshold and a historical state of the heater after the engine is normally started in the history. The other devices include any devices other than the heater among all the devices connected to the controller. The first calibration parameter includes one or more of material of the heater, a minimum intake air temperature required for engine ignition, a minimum heated intake air volume required for engine ignition, and leakage loss of intake air at a low temperature. Each of the second calibration parameters includes at least one of a voltage calibration value and a current calibration value associated with a device.

In an embodiment, the determining a first target control command based on the initial temperature parameter and a controller application analysis result includes: selecting a minimum initial temperature parameter from the initial temperature parameter as a target temperature; analyzing the target temperature, the initial state information, the first calibration parameter and each of the historical data to determine a target heated intake air volume required for engine ignition; and determining the first target control command for the heater based on the target heated intake air volume and a power of the heater.

In an embodiment, after transmitting the first target control command to the controller via the CAN bus, the control method further includes: continuously acquiring a real-time temperature parameter associated with the heater, where the real-time temperature parameter includes at least one of a real-time ambient temperature, a real-time intake air temperature, a real-time water temperature and a real-time oil temperature; comparing the real-time temperature parameter with each of the historical data every time the real-time temperature parameter is obtained to obtain a comparison result; and transmitting a disconnection control command to the controller via the CAN bus when it is determined that the real-time temperature parameter reaches a historical temperature threshold corresponding to a normal start of the engine based on the comparison result.

In an embodiment, after transmitting the first target control command to the controller via the CAN bus, the control method further includes: continuously receiving real-time state information, fed back by the controller, of the controller and real-time state information of each of the devices connected to the controller via the CAN bus. After transmitting the disconnection control command to the controller via the CAN bus, the control method further includes: outputting a start command to the engine, and obtaining a target measurement parameter of a target device after it is determined that the engine is normally started, where the target device includes at least one of all the devices connected to the controller, the target measurement parameter includes at least one of the real-time temperature parameter and a real-time measurement value associated with each of the other devices, and the real-time measurement value includes at least one of a real-time voltage and a real-time current of a corresponding device; analyzing the target measurement parameter, a calibration parameter corresponding to the target device in the controller application analysis result, each of the historical data and the real-time state information to determine a second target control command corresponding to the target device; and continuously transmitting the second target control command to the controller via the CAN bus, where the controller controls the target device to operate based on the second target control command.

In an embodiment, the control method further includes: receiving, via the CAN bus, target state information from the controller, where the target state information is one of the initial state information and the real-time state information; comparing, after it is determined that the target state information includes fault alarm information, the fault alarm information with a fault determination analysis result, and outputting alarm prompt information based on a comparison result, where the fault determination analysis result includes the fault alarm information and fault prompt information matching the fault alarm information. The preset state includes at least one of an abnormal state and a state that does not match a current control command received by the controller. The current control command includes one of the initial control command, the first target control command, and the second target control command.

A control apparatus is provided according to a third aspect of the present disclosure. The control apparatus is applied to a controller in an engine. The controller includes a main control circuit board, a fault detection circuit board, a field-effect transistor MOS array, and a conduction control circuit board for controlling a MOS in the MOS array to be turned on. The control apparatus includes a receiving module, a first transmitting module, a second transmitting module and a control module. The receiving module is configured to receive, via a CAN bus, an initial control command from an ECU in the engine after the ECU is powered on. The first transmitting module is configured to control the fault detection circuit board to detect initial states of the controller and all devices connected to the controller based on the initial control command to obtain initial state information, and transmit the initial state information to the ECU via the CAN bus. The second transmitting module is configured to receive, via the CAN bus, a first target control command from the ECU. The first target control command is transmitted by the ECU after determining that the initial state information indicates that each of the initial states of the controller and all the devices connected to the controller is a preset state. The control module is configured to control the conduction control circuit board to turn on at least one MOS in the MOS array based on the first target control command to output a control signal to a heater connected to the controller to control the heater to operate.

In an embodiment, the first transmitting module is configured to control the fault detection circuit board to detect the initial states of the controller and all devices connected to the controller based on the initial control command to obtain the initial state information by: transmitting, by using the main control circuit board, the initial control command to the fault detection circuit board; detecting, by using the fault detection circuit board after receiving the initial control command, the initial states of the controller and all the devices connected to the controller based on a self-learning detection strategy to obtain the initial state information; and transmitting, by using the fault detection circuit board, the initial state information to the main control circuit board.

In an embodiment, the first transmitting module is further configured to, after receiving the first target control command from the ECU via the CAN bus, transmit the first target control command to the fault detection circuit board by using the main control circuit board; after receiving the first target control command, detect, by using the fault detection circuit board based on a self-learning detection strategy, a real-time state of each of the controller and all the devices connected to the controller to determine real-time state information of each of the controller and all the devices connected to the controller, and continuously transmit, by using the fault detection circuit board, the real-time state information of the controller and all the devices connected to the controller to the main control circuit board; and continuously feedback, by using the main control circuit board via the CAN bus, the real-time state information of the controller and all the devices connected to the controller to the ECU.

In an embodiment, the control module is configured to control the conduction control circuit board to turn on at least one MOS in the MOS array based on the first target control command by: transmitting the first target control command to the conduction control circuit board; and turning on, after receiving the first target control command, at least one MOS in the MOS array based on the first target control command. The control module is further configured to, after controlling the conduction control circuit board to turn on at least one MOS in the MOS array, receive, via the CAN bus, a disconnection control command from the ECU, and transmit the disconnection control command to the conduction control circuit board, where the disconnection control command is transmitted by the ECU when determining that an obtained real-time temperature parameter associated with the heater reaches a historical temperature threshold corresponding to a normal start of the engine; and turn off the at least one MOS corresponding to the first target control command after the disconnection control command is received.

In an embodiment, the control module is further configured to, after the at least one MOS corresponding to the first target control command is turned off, continuously receive a second target control command for a target device from the ECU, and control the conduction control circuit board to turn on a MOS in the MOS array corresponding to the target device based on the second target control command to output a control signal to the target device to control the target device to operate. The target device includes at least one of all the devices connected to the controller. The second target control command is transmitted by the ECU after outputting a start command to the engine and determining that the engine is normally started.

In an embodiment, the control module is further configured to: in a case that it is determines that one of the controller and the devices connected to the controller is not in the preset state, add fault alarm information corresponding to the one of the controller and the devices in target state information, and transmit the target state information to the main control circuit board, where the target state information is one of the initial state information and real-time state information; and transmit the target state information to the ECU via the CAN bus, where the ECU compares the fault alarm information in the target state information with a fault determination analysis result and outputs alarm prompt information based on a comparison result, and the fault determination analysis result includes the fault alarm information and fault prompt information matching the fault alarm information. The preset state includes at least one of an abnormal state and a state that does not match a current control command received by the controller. The current control command includes one of the initial control command, the first target control command, and the second target control command.

In an embodiment, the self-learning detection strategy includes at least one of: detecting a first temperature of the controller, and determining whether the controller is in the abnormal state based on the first temperature and a historical fault temperature analysis result; for each of MOSs included in the controller, determining a current state of the MOS and determining whether the current state of the MOS matches the current control command based on the current state of the MOS; for each of the devices connected to the controller, detecting a second temperature of the device, and determining whether the device is in the abnormal state based on the second temperature of the device and a temperature of the device in the historical fault temperature analysis result; and for each of the devices connected to the controller, detecting a current state of the device after being powered on, and determining whether the current state matches the current control command based on the current state of the device.

A control apparatus is provided according to a fourth aspect of the present disclosure. The control apparatus is applied to an ECU in an engine. The control device includes an obtaining module, a determining module and a transmitting module. The obtaining module is configured to, after the ECU is powered on, obtain an initial temperature parameter, and transmit an initial control command to a controller in the engine via a CAN bus. The initial temperature parameter includes at least one of an initial ambient temperature, an initial intake air temperature, an initial water temperature and an initial oil temperature. The determining module is configure to receive, via the CAN bus, initial state information from the controller, and determine, after it is determined that the initial state information indicates that each of initial states of the controller and all devices connected to the controller is a preset state, a first target control command based on the initial temperature parameter and a controller application analysis result. The transmitting module is configure to transmit the first target control command to the controller via the CAN bus, where a main control circuit board in the controller controls a conduction control circuit board in the controller to turn on at least one MOS in a MOS array in the controller based on the first target control command to output a control signal to a heater connected to the controller to control the heater to operate.

In an embodiment, the controller application analysis result includes a first calibration parameter associated with the heater, second calibration parameters associated with other devices, historical data associated with the controller and historical data associated with the heater. The historical data associated with the controller includes a historical temperature threshold and a historical state of the controller after the engine is normally started in the history, and the historical data associated with the heater includes a historical temperature threshold and a historical state of the heater after the engine is normally started in the history. The other devices includes any devices other than the heater among all the devices connected to the controller. The first calibration parameter includes one or more of material of the heater, a minimum intake air temperature required for engine ignition, a minimum heated intake air volume required for engine ignition, and leakage loss of intake air at a low temperature. Each of the second calibration parameters includes at least one of a voltage calibration value and a current calibration value associated with a device.

In an embodiment, the determining module is configure to determine the first target control command based on the initial temperature parameter and the controller application analysis result by: selecting a minimum initial temperature parameter from the initial temperature parameter as a target temperature, analyzing the target temperature, the initial state information, the first calibration parameter and each of the historical data to determine a target heated intake air volume required for engine ignition, and determining the first target control command for the heater based on the target heated intake air volume and a power of the heater.

In an embodiment, the transmitting module is further configure to, after the first target control command is transmitted to the controller via the CAN bus, continuously obtain a real-time temperature parameter associated with the heater, where the real-time temperature parameter includes at least one of a real-time ambient temperature, a real-time intake air temperature, a real-time water temperature and a real-time oil temperature; compare the real-time temperature parameter with each of the historical data every time the real-time temperature parameter is obtained to obtain a comparison result; and transmit a disconnection control command to the controller via the CAN bus when it is determined that the real-time temperature parameter reaches a historical temperature threshold corresponding to a normal start of the engine based on the comparison result.

In an embodiment, the transmitting module is further configure to, after the first target control command is transmitted to the controller via the CAN bus, continuously receive real-time state information, fed back by the controller, of the controller and real-time state information of each of the devices connected to the controller via the CAN bus. The transmitting module is further configure to, after the disconnection control command is transmitted to the controller via the CAN bus, output a start command to the engine, and obtain a target measurement parameter of a target device after it is determined that the engine is normally started, where the target device includes at least one of all the devices connected to the controller, the target measurement parameter includes at least one of the real-time temperature parameter and a real-time measurement value associated with each of the other devices, and the real-time measurement value includes at least one of a real-time voltage and a real-time current of a corresponding device; analyze the target measurement parameter, a calibration parameter corresponding to the target device in the controller application analysis result, each of the historical data and real-time state information to determine a second target control command corresponding to the target device; and continuously transmit the second target control command to the controller via the CAN bus, where the controller controls the target device to operate based on the second target control command.

In an embodiment, the determining module is further configure to: receive, via the CAN bus, target state information from the controller, where the target state information is one of the initial state information and the real-time state information; compare, after it is determined that the target state information includes fault alarm information, the fault alarm information with a fault determination analysis result, and output alarm prompt information based on a comparison result, where the fault determination analysis result includes the fault alarm information and fault prompt information matching the fault alarm information. The preset state includes at least one of an abnormal state and a state that does not match a current control command received by the controller. The current control command includes one of the initial control command, the first target control command, and a second target control command.

An electronic device is provided according to a fifth aspect of the present disclosure. The electronic device includes a processor and a memory. The memory stores program codes. The program codes, when executed by the processor, cause the processor to perform the control method according to any one of the first aspect and the second aspect.

A computer-readable storage medium is provided according to a sixth aspect of the present disclosure. The computer-readable storage medium stores a computer program. The computer program, when executed by a processor, causes the processor to perform the control method according to any one of the first aspect and the second aspect.

In addition, for the technical effects by any one of the implementations in the second aspect to the sixth aspect, one may refer to the technical effects of the different implementation in the first aspect, which are not repeated herein.

DETAILED DESCRIPTION

Figure 1:
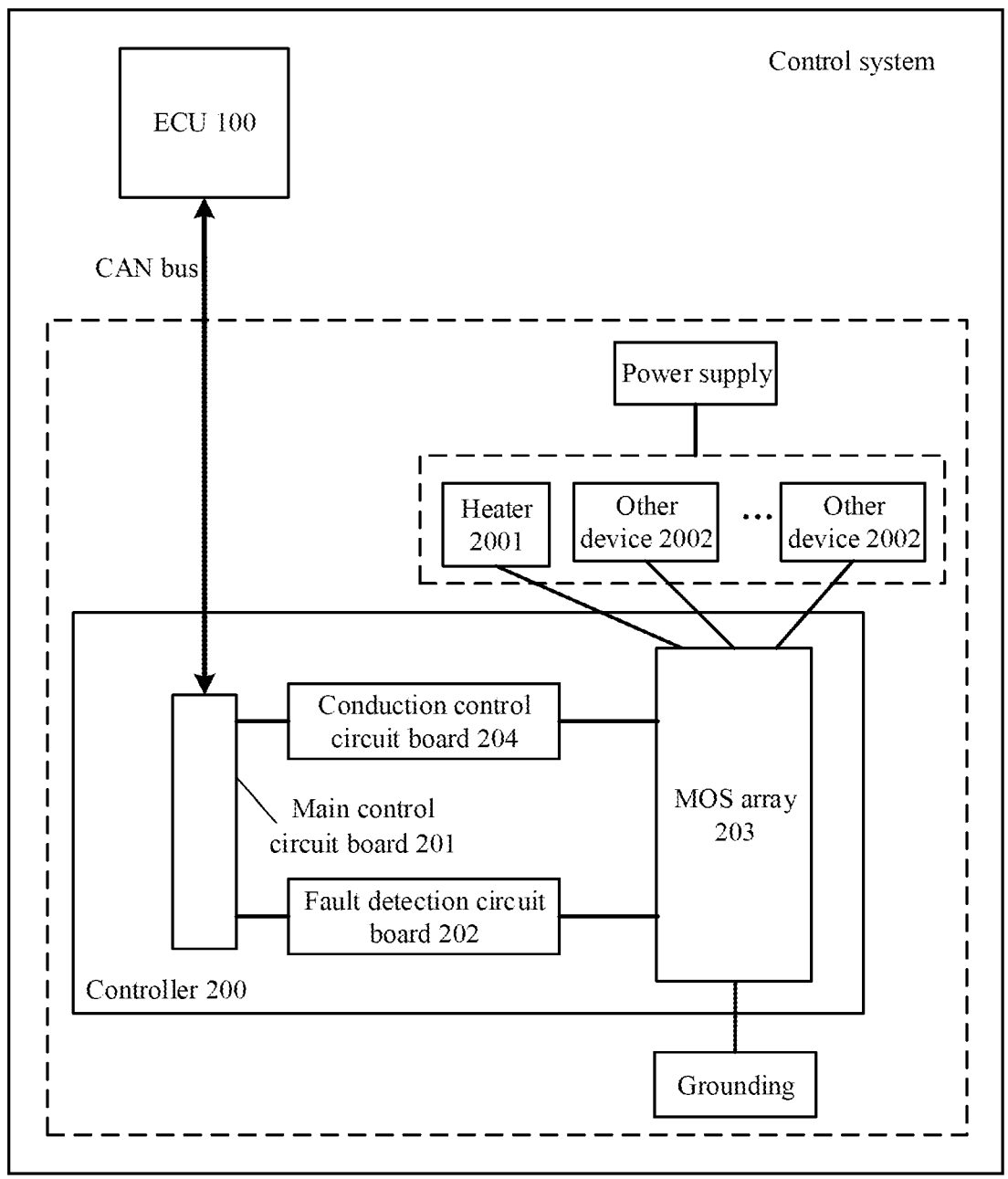
FIG. 1 is a schematic diagram showing a system structure of a control system according to an embodiment of the present disclosure.

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

It should be noted that the terms such as "first", "second" and the like in the description, claims and the above drawings are only used to distinguish similar objects, rather than describe a particular or chronological order. It should be understood that data used in the above way may be exchanged in an appropriate case, such that the embodiments of the present disclosure described here can be implemented in an order different from the order shown or described here.

Hereinafter, some terms in the embodiments of the present disclosure are explained for the convenience of those skilled in the art.

The term "and/or" in the embodiments of the present disclosure are used to describe an association relationship between associated objects, indicating three relationships. For example, the expression "A and/or B" may indicates that only A exists, both A and B exists, and only B exists. The symbol "/" is generally used to indicate an "or" relationship between associated objects.

The term "ECU" in the embodiments of the present disclosure is an electronic control unit (ECU) in an engine, also known as "driving computer", "vehicle computer", and the like.

The term "CAN" in the embodiments of the present disclosure is a controller area network (CAN), and is one of the most widely used field buses.

The term "MOS" in the embodiments of the present disclosure is an abbreviation of a field-effect transistor MOSFET. Metal-oxide-semiconductor field-effect transistor (MOSFET) is a field effect transistor that may be widely used in analog circuits and digital circuits.

In order to solve the problem that a power of a heater cannot be adjusted at any time with a relay control method according to the conventional technology, in an embodiment of the present disclosure, a main control circuit board in a controller controls, based on an initial control command received from an ECU via a CAN bus after the ECU is powered on, a fault detection circuit board to detect initial states of the controller and all devices connected to the controller to obtain initial state information, and transmits the initial state information to the ECU via the CAN bus. Then, the main control circuit board receives a first target control command via the CAN bus from the ECU, and controls a conduction control circuit board to turn on at least one MOS in a MOS array based on the first target control command to output a control signal to a heater connected to the controller to control the heater to operate. The first target control command is transmitted by the ECU after determining that the initial state information indicates that each of the initial states of the controller and all the devices connected to the controller is a preset state, so as to realize closed-loop control of the heater and adjust a power of the heater at any time.

The embodiments of the present disclosure are described in further detail below in combination with the drawings. It should be understood that the preferred embodiments described herein are only used to illustrate and explain the present disclosure, and are not intended to limit the present disclosure. In addition, the embodiments of the present disclosure and features in the embodiments may be combined with each other if there is no conflict.

FIG. 1 is a schematic diagram showing a system structure of a control system according to an embodiment of the present disclosure. As shown in FIG. 1, in the embodiment of the present disclosure, the control system includes an ECU 100 and a controller 200. The controller 200 is configured to control one of all devices connected to the controller 200 to operate.

For example, as shown in FIG. 1, in the embodiment of the present disclosure, all the devices connected to the controller 200 may include, but are not limited to, a heater 2001 and other devices 2002.

As shown in FIG. 1, in the embodiment of the present disclosure, the controller 200 includes a main control circuit board 201, a fault detection circuit board 202, a field effect transistor MOS (that is an abbreviation of MOSFET) array 203, and a conduction control circuit board 204.

The main control circuit board 201 is configured to communicate with the ECU 100 in the engine via a CAN bus and receive a control command, and transmit the control command to the fault detection circuit board 202, the conduction control circuit board 204 and the like. The main control circuit board 201 is further configured to receive target state information from the fault detection circuit board 202, and feedback the target state information to the ECU 100 in the engine via the CAN bus.

The fault detection circuit board 202 is configured to detect, after receiving the control command from the main control circuit board 201, states of the controller 200 and all the devices connected to the controller 200 based on a self-learning detection strategy to obtain the target state information, and transmit the obtained target state information to the main control circuit board 201.

The MOS array 203 is configured to perform a failure protection of the controller 200 to avoid burning of a circuit of a vehicle caused by any one device connected to the controller 200 in a continuous operation state due to failure of a MOS.

The conduction control circuit board 204 is configured to control, after receiving the control command from the main control circuit board 201, a MOS in the MOS array 203 to be turned on based on the control command to output a control signal to at least one device connected to the controller 200 to control the device to operate.

In the embodiment of the present disclosure, the controller 200 may perform real-time message communication with the ECU 100 via the CAN bus to perform real-time monitoring and real-time control to quickly determine a control strategy according to a condition, and quickly transmit a control command corresponding to the determined control strategy to the controller 200 via the CAN bus, so that the controller 200 controls the conduction control circuit board 204 to turn on at least one MOS in the MOS array 203 based on the received control command. In this way, different currents can be outputted to drive different devices, and powers of all devices connected to the controller 200 can be controlled at any time.

Figure 2:
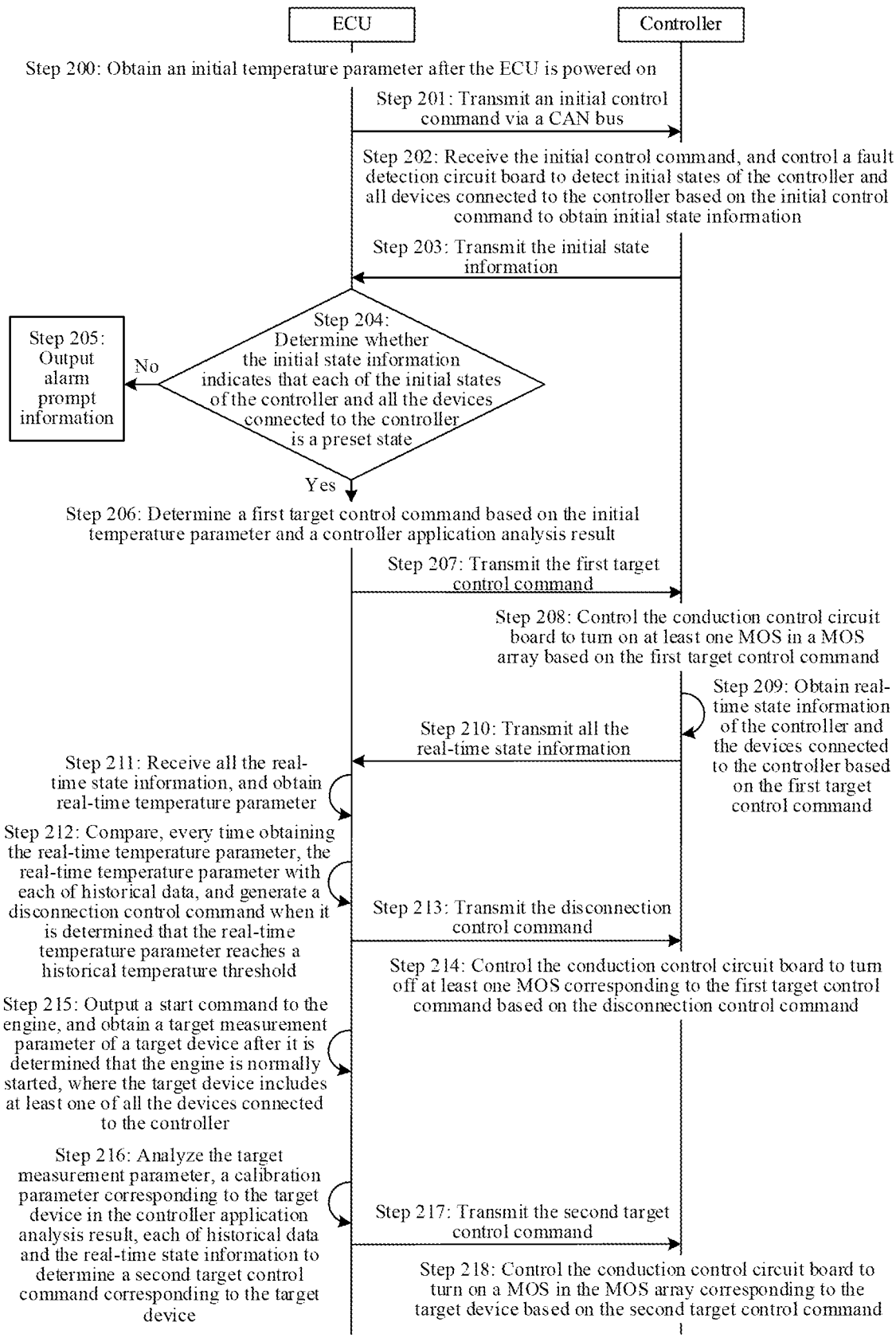
FIG. 2 is a flow chart of a control method according to an embodiment of the present disclosure.

As shown in FIG. 2, a control method is provided according to an embodiment of the present disclosure. The control method is applied to the above control system, and includes the following steps 200 to 218.

In step 200, an initial temperature parameter is obtained after the ECU is powered on. The initial temperature parameter includes at least one of an initial ambient temperature, an initial intake air temperature, an initial water temperature and an initial oil temperature.

In the embodiment of the present disclosure, in step 200, the initial temperature parameter is obtained after the ECU is powered on. The initial temperature parameter is used to determine a first target control command for the heater 2001 connected to the controller 200, so as to facilitate the ECU to start the engine.

In step 201, the ECU transmit an initial control command to the controller 200 via the CAN bus.

In the embodiment of the present disclosure, in step 201, the ECU transmits the initial control command to the controller via the CAN bus, so that the controller 200 detects, after receiving the initial control command, initial states of the controller 200 and all devices connected to the controller 200 based on the initial control command to obtain initial state information.

In step 202, the main control circuit board 201 in the controller 200 receives, via the CAN bus, the initial control command from the ECU after the ECU is powered on, and controls the fault detection circuit board 202 to detect the initial states of the controller 200 and all the devices connected to the controller 200 based on the initial control command to obtain the initial state information.

In the embodiment of the present disclosure, the main control circuit board 201 in the controller 200, after receiving the initial control command from the ECU after the ECU is powered on, realizes the above functions by performing the following operations 1 to 3.

In operation 1, the main control circuit board 201 transmits the initial control command to the fault detection circuit board 202.

In operation 2, the fault detection circuit board 202 detects, after receiving the initial control command, the initial states of the controller 200 and all the devices connected to the controller based on a self-learning detection strategy to obtain the initial state information.

In the embodiment of the present disclosure, the self-learning detection strategy includes at least one of:

1. detecting a first temperature of the controller 200, and determining whether the controller 200 is in the abnormal state based on the first temperature and a historical fault temperature analysis result;

2. for each of MOSs included in the controller 200, determining a current state of the MOS and determining whether the current state of the MOS matches the current control command based on the current state of the MOS, where the current control command is the initial control command;

3. for each of the devices connected to the controller 200, detecting a second temperature of the device, and determining whether the device is in the abnormal state based on the second temperature of the device and a temperature of the device in the historical fault temperature analysis result; and 4. for each of the devices connected to the controller 200, detecting a current state of the device after being powered on, and determining whether the current state matches the current control command based on the current state of the device, where the current control command is the initial control command.

In the embodiment of the present disclosure, in a case that the fault detection circuit board 202 determines that one of the controller 200 and the devices connected to the controller 200 is not in the preset state based on the self-learning detection strategy, the fault detection circuit board 202 adds fault alarm information corresponding to the one of the controller 200 and the devices connected to the controller in the initial state information. Based on the fault alarm information, the ECU compares the fault alarm information included in the initial state information with a fault determination analysis result, and then outputs alarm prompt information based on a comparison result. The fault determination analysis result includes the fault alarm information and fault prompt information matching the fault alarm information. The preset state includes an abnormal state and/or a state that does not match the current control command (that is, the initial control command).

In operation 3, the fault detection circuit board 202 transmits the initial state information to the main control circuit board 201.

In practices, in feeding back the fault alarm information to the ECU, the fault detection circuit board 202 may add, based on a fault type, a fault code, an alarm or a prompt to the initial state information. The fault type includes an abnormal operation current fault (for example, whether there is short circuit, an open circuit, an increase in contact resistance for the heater and other devices), a self-test state fault of the controller (for example, a load is not connected, an adhesion failure, or an over-temperature alarm), a previous off state fault, a current temperature fault of the controller 200, an overcurrent alarm, an overvoltage alarm, an under-voltage alarm fault, and whether the intake air temperature and other states of the heater 2001 are abnormal.

In the embodiment of the present disclosure, the fault detection circuit board 202 in the controller 200 may detect an initial state of any one of the controller 200 and all the devices connected to the controller, and in a case that the initial state of the any one of the controller 200 and the devices is an abnormal state and/or an state does not match the initial control command, the fault detection circuit board 202 adds fault alarm information corresponding to the any one of the controller 200 and the devices in the corresponding initial state information and transmits the initial state information to the ECU via the CAN bus. Alternatively, the fault detection circuit board 202 may detect the initial states of all the controller 200 and the devices connected to the controller 200, then determines initial state information, and then transmits the initial state information the ECU via the CAN bus.

In step 203, the main control circuit board 201 in the controller 200 transmits the initial state information to the ECU via the CAN bus.

In step 204, the ECU receives the initial state information from the controller 200 via the CAN bus, and determines whether the initial state information indicates that each of the initial states of the controller 200 and all the devices connected to the controller 200 is a preset state. In a case that the initial state information indicates that each of the initial states of the controller 200 and all the devices connected to the controller 200 is the preset state, proceed to step 206. In a case that the initial state information does not indicate that each of the initial states of the controller 200 and all the devices connected to the controller 200 is the preset state, proceed to step 205.

In the embodiment of the present disclosure, in step 204, the preset state includes an abnormal state and/or a state that does not match the current control command (that is, the initial control command) received by the controller 200.

In step 205, in a case that the ECU determines that the initial state information indicates that any one of the controller 200 and all the devices connected to the controller 200 is not in the preset state, the ECU compares the fault alarm information in the initial state information with the fault determination analysis result, and outputs alarm prompt information based on a comparison result. The fault determination analysis result includes the fault alarm information and fault prompt information matching the fault alarm information.

In step 206, after determining that the initial state information indicates that each of the initial states of the controller 200 and all the devices connected to the controller 200 is the preset state, the ECU determines a first target control command based on the initial temperature parameter and a controller application analysis result.

In the embodiment of the present disclosure, the controller application analysis result includes a first calibration parameter associated with the heater, second calibration parameters associated with other devices, historical data associated with the controller and historical data associated with the heater. The historical data includes a historical temperature threshold and a historical state of the controller or a historical temperature threshold and a historical state of the heater 2001 after the engine is normally started in the history. The other devices include any devices other than the heater 2001 among all the devices connected to the controller 200. The first calibration parameter includes one or more of material of the heater, a minimum intake air temperature required for engine ignition, a minimum heated intake air volume required for engine ignition, and leakage loss of intake air at a low temperature. Each of the second calibration parameters includes at least one of a voltage calibration value and a current calibration value associated with a device.

Therefore, in the embodiment of the present disclosure, in step 206, the first target control command is determined by: selecting a minimum initial temperature parameter from the initial temperature parameter as a target temperature, analyzing the target temperature, the initial state information, the first calibration parameter and each of the historical data to determine a target heated intake air volume required for engine ignition, and determining the first target control command for the heater based on the target heated intake air volume and a power of the heater.

In step 207, the ECU transmits the first target control command to the controller 200 via the CAN bus.

In the embodiment of the present disclosure, the ECU transmits the first target control command to the controller 200 via the CAN bus, so that the main control circuit board 201 in the controller 200 controls the conduction control circuit board 204 in the controller 200 to turn on at least one MOS in the MOS array 203 in the controller 200 based on the first target control command to output a control signal to the heater 2001 connected to the controller 200 to control the heater 2001 to operate.

In step 208, the main control circuit board 201 in the controller 200 receives, via the CAN bus, the first target control command from the ECU, and controls the conduction control circuit board to turn on at least one MOS in the MOS array 203 based on the first target control command to output the control signal to the heater 2001 connected to the controller 200 to control the heater 2001 to operate.

In the embodiment of the present disclosure, the functions in step 208 are realized by performing the following operations 1 and 2.

In operation 1, the main control circuit board 201 transmits the first target control command to the conduction control circuit board 204.

In operation 2, the conduction control circuit board 204 turns on, after receiving the first target control command, at least one MOS in the MOS array 203 based on the first target control command.

In step 209, the main control circuit board 201 in the controller 200 obtains real-time state information of the controller 200 and the devices connected to the controller 200 based on the first target control command.

In the embodiment of the present disclosure, after receiving the first target control command, the main control circuit board 201 may perform the following operations 1 and 2 in step 209 to obtain the real-time state information of the controller 200 and the devices connected to the controller 200.

In operation 1, the main control circuit board 201 transmits the first target control command to the fault detection circuit board.

In operation 2, the fault detection circuit board 202 detects, after receiving the first target control command, a real-time state of each of the controller 200 and the devices connected to the controller 200 to determine the real-time state information corresponding to each of the controller 200 and the devices connected to the controller 200 based on a self-learning detection strategy.

In the embodiment of the present disclosure, the self-learning detection strategy includes at least one of:

1. detecting a first temperature of the controller 200, and determining whether the controller 200 is in the abnormal state based on the first temperature and a historical fault temperature analysis result;

2. for each of MOSs included in the controller 200, determining a current state of the MOS and determining whether the current state of the MOS matches the current control command based on the current state of the MOS, where the current control command is the first target control command;

3. for each of the devices connected to the controller 200, detecting a second temperature of the device, and determining whether the device is in the abnormal state based on the second temperature of the device and a temperature of the device in the historical fault temperature analysis result; and 4. for each of the devices connected to the controller 200, detecting a current state of the device after being powered on, and determining whether the current state matches the current control command based on the current state of the device, where the current control command is the first target control command.

In the embodiment of the present disclosure, in a case that the fault detection circuit board determines that one of the controller 200 and the devices connected to the controller 200 is not in the preset state based on the self-learning detection strategy, the fault detection circuit board 202 adds fault alarm information corresponding to the one of the controller 200 and the devices connected to the controller 200 in the real-time state information.

In an operation 3, the fault detection circuit board 202 continuously transmits the real-time state information of the controller 200 and all the devices connected to the controller 200 to the main control circuit board 201.

In step 210, the main control circuit board 201 in the controller 200 continuously feeds back the real-time state information of the controller 200 and all the devices connected to the controller to the ECU via the CAN bus.

In the embodiment of the present disclosure, by performing step 210, the ECU may obtain the real-time state information obtained by the controller 200 performing detection on the real-time state of each of the controller 200 and the devices connected to the controller 200 in real time. In this way, the ECU may timely obtain the real-time state of each of the controller and the devices connected to the controller.

It should be noted that in the embodiment of the present disclosure, the ECU may transmit one or more first target control commands via the CAN bus to achieve the expected target heated intake air volume. In the embodiment of the present disclosure, in order to facilitate the description of the control method, the number of the first target control command transmitted by the ECU is not limited, and the following description is briefly given with an example of transmitting the first target control command. In practices, the expected target heated intake air volume may be obtained by transmitting multiple first target control commands.

In the embodiment of the present disclosure, in a case that the ECU transmits multiple first target control commands, the ECU performs ECU comparison analysis based on the real-time state information and an obtained real-time temperature parameter, timely determines the control strategy based on the controller application analysis result, and timely transmits a control command corresponding to the control strategy to the controller 200 via the CAN bus, thereby adjusting the power of the heater at any time.

In an embodiment of the present disclosure, the control strategy includes but is not limited to the following four control strategies.

For a first control strategy, that is, a strategy for a temperature less than or equal to −50° C., a current ranging from 100 A to 120 A is outputted to control the heater to operate, and the time period is equal to 50 s.

For a second control strategy, that is, a strategy for a temperature less than or equal to −40° C., a current ranging from 80 A to 100 A is outputted to control the heater to operate, and the time period is equal to 50 s.

For a third control strategy, that is, a strategy for a temperature less than or equal to −30° C., a current ranging from 60 A to 80 A is outputted to control the heater to operate, and the time period is equal to 50 s.

For a fourth control strategy, that is, a strategy for a temperature less than or equal to −20° C., a current ranging from 40 A to 60 A is outputted to control the heater to operate, and the time period is equal to 40 s.

It should be noted that the embodiments of the present disclosure are not limited to the above control strategies. In practices, for different engines, the control strategy is different, and the power of the heater is different.

In step 211, the ECU continuously receives, via the CAN bus, the real-time state information of each of the controller 200 and the devices connected to the controller 200 that is fed back by the controller 200, and continuously obtains the real-time temperature parameter associated with the heater. The real-time temperature parameter includes at least one of a real-time ambient temperature, a real-time intake air temperature, a real-time water temperature and a real-time oil temperature.

In step 212, the ECU compares, every time obtaining the real-time temperature parameter, the real-time temperature parameter with each of the historical data, and generates a disconnection control command when it is determined that the real-time temperature parameter reaches a historical temperature threshold corresponding to a normal start of the engine based on a comparison result.

In step 213, the ECU transmits the disconnection control command to the controller 200 via the CAN bus.

In step 214, the main control circuit board 201 in the controller 200 receives, via the CAN bus, the disconnection control command from the ECU, and controls the conduction control circuit board 204 to turn off at least one MOS corresponding to the first target control command based on the disconnection control command.

In the embodiment of the present disclosure, the functions in step 214 is realized by performing the following operations 1 and 2.

In operation 1, the main control circuit board 201 receives, via the CAN bus, the disconnection control command from the ECU, and transmits the disconnection control command to the conduction control circuit board 204. The disconnection control command is transmitted by the ECU after determining that an obtained real-time temperature parameter associated with the heater reaches a historical temperature threshold corresponding to a normal start of the engine.

In operation 2, the conduction control circuit board 204 turns off, after receiving the disconnection control command, at least one MOS corresponding to the first target control command.

In step 215, the ECU outputs a start command to the engine, and obtains a target measurement parameter of a target device after it is determined that the engine is normally started. The target device includes at least one of all the devices connected to the controller 200. The target measurement parameter includes at least one of the real-time temperature parameter and a real-time measurement value associated with each of the other devices. The real-time measurement value includes at least one of a real-time voltage and a real-time current of a corresponding device.

In the embodiment of the present disclosure, after step 214 is performed, the controller 200 turns off at least one MOS corresponding to the first target control command, so as to stop the power supply to the heater 2001 and the heater 2001 stops heating. In step 215, the ECU outputs the start command to the engine to start the engine, and obtains the target measurement parameter of the target device after it is determined that the engine is normally started. The target device includes the heater and/or any one of the devices connected to the controller 200, so that the target device is controlled.

In step 216, the ECU analyzes the target measurement parameter, a calibration parameter corresponding to the target device in the controller application analysis result, each of the historical data and the real-time state information to determine a second target control command corresponding to the target device.

In step 217, the ECU continuously transmits the second target control command to the controller 200 via the CAN bus, so that the controller 200 controls the target device to operate based on the second target control command.

In step 218, the main control circuit board 201 in the controller 200 continuously receives the second target control command for the target device from the ECU, and controls the conduction control circuit board 204 to turn on a MOS in the MOS array 203 corresponding to the target device based on the second target control command to output the control signal to the target device to control the target device to operate.

In the embodiment of the present disclosure, the functions in step 218 are realized by performing the following operations 1 and 2.

In operation 1, the main control circuit board 201 transmits the second target control command to the conduction control circuit board 204.

In operation 2, the conduction control circuit board 204 turns on, after receiving the second target control command, the MOS in the MOS array 203 corresponding to the target device based on the second target control command.

It should be noted that in the embodiment of the present disclosure, the control strategy for other devices is similar to the control strategy for the heater 2001, which is not repeated herein. Further, the embodiment of the present disclosure is not limited to the above control method.

Figure 3:
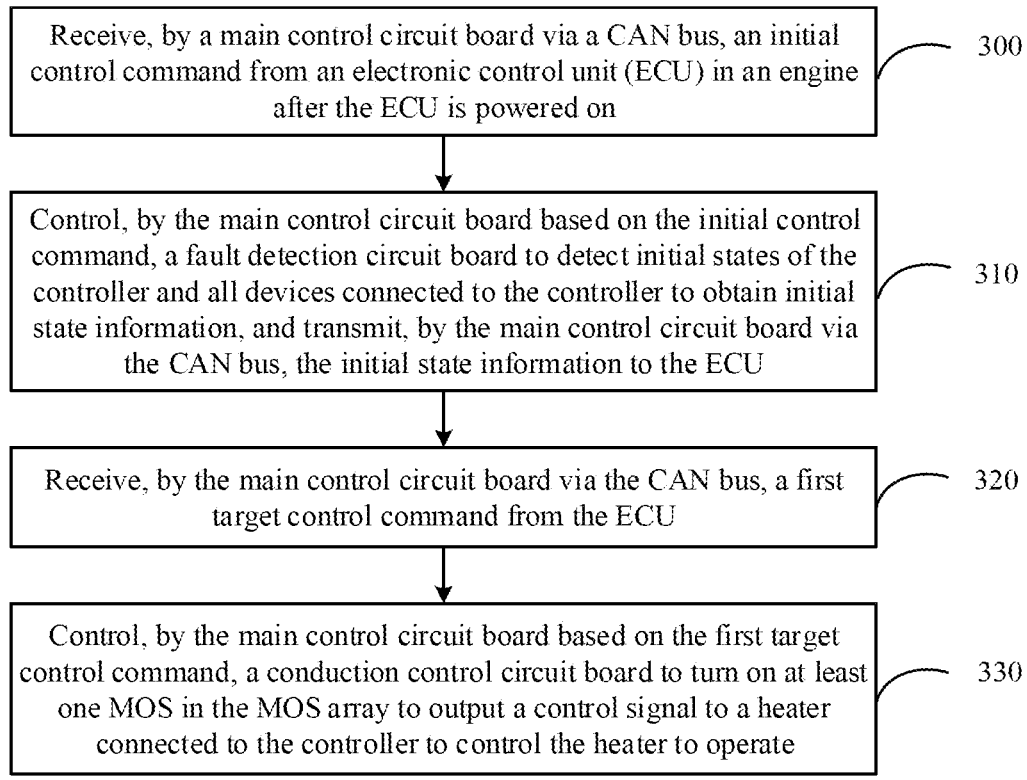
FIG. 3 is a flow chart of a control method according to an embodiment of the present disclosure.

As shown in FIG. 3, a control method is provided according to an embodiment of the present disclosure. The control method is applied to a controller 200 in an engine. The controller 200 includes a main control circuit board 201, a fault detection circuit board 202, a field-effect transistor MOS array 203, and a conduction control circuit board 204 for controlling a MOS in the MOS array 203 to be turned on. The control method includes the following steps 300 to 330.

In step 300, the main control circuit board 201 receives, via a CAN bus, an initial control command from the ECU in the engine after the ECU is powered on.

In step 310, the main control circuit board 201 controls the fault detection circuit board 202 to detect initial states of the controller 200 and all devices connected to the controller 200 based on the initial control command to obtain initial state information, and transmits the initial state information to the ECU via the CAN bus.

In step 320, the main control circuit board 201 receives, via the CAN bus, a first target control command from the ECU. The first target control command is transmitted by the ECU after determining that the initial state information indicates that each of the initial states of the controller 200 and all the devices connected to the controller is a preset state.

In step 330, the main control circuit board 201 controls the conduction control circuit board 204 to turn on at least one MOS in the MOS array 203 based on the first target control command to output a control signal to a heater 2001 connected to the controller 200 to control the heater 2001 to operate.

Figure 4:
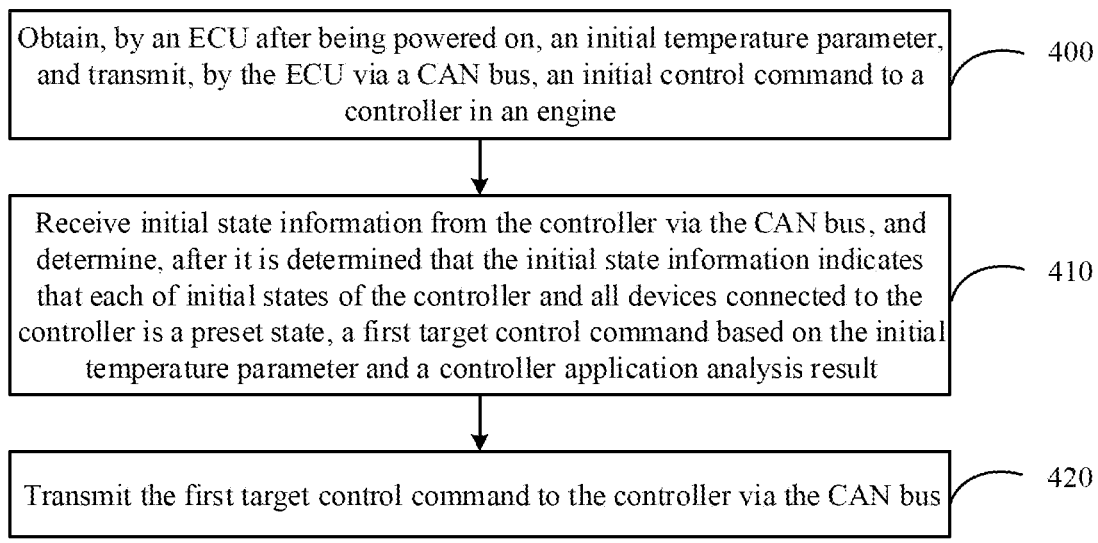
FIG. 4 is a flow chart of a control method according to an embodiment of the present disclosure.

As shown in FIG. 4, a control method is provided according to an embodiment of the present disclosure. The control method is applied to an ECU in an engine. The control method includes the following steps 400 to 420.

In step 400, an initial temperature parameter is obtained after the ECU is powered on, and an initial control command is transmitted to a controller 200 via a CAN bus. The initial temperature parameter includes at least one of an initial ambient temperature, an initial intake air temperature, an initial water temperature and an initial oil temperature.

In step 410, initial state information, from the controller 200 is received via the CAN bus, and a first target control command is determined based on the initial temperature parameter and a controller application analysis result after it is determined that the initial state information indicates that each of initial states of the controller 200 and all devices connected to the controller 200 is a preset state.

In step 420, the first target control command is transmitted to the controller 200 via the CAN bus, so that a main control circuit board 201 in the controller 200 controls a conduction control circuit board 204 in the controller 200 to turn on at least one MOS in a MOS array 203 in the controller 200 based on the first target control command to output a control signal to a heater 2001 connected to the controller 200 to control the heater 2001 to operate.

It should be noted that in the embodiment of the present disclosure, the ECU may be another system in the vehicle system, and may communicate with the controller 200 via the CAN bus or other related buses to perform a control strategy between the another system and the controller 200.

Figure 5:
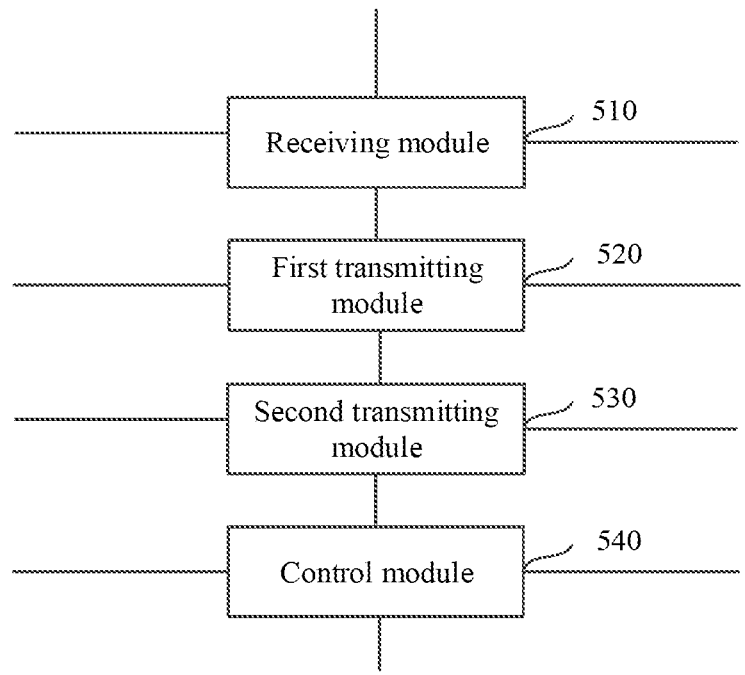
FIG. 5 is a schematic diagram showing a logic structure of a control apparatus according to an embodiment of the present disclosure.

Based on the same concept, as shown in FIG. 5, a control apparatus is provided according to an embodiment of the present disclosure. The control apparatus is applied to a controller 200 in an engine. The controller 200 includes a main control circuit board 201, a fault detection circuit board 202, a field-effect transistor MOS array 203, and a conduction control circuit board 204 for controlling a MOS in the MOS array 203 to be turned on. The control apparatus includes a receiving module 510, a first transmitting module 520, a second transmitting module 530 and a control module 540. In one embodiment, a module is hardware (e.g., a computer processor), software, or a combination of hardware and software configured to perform the functions described herein.

The receiving module 510 is configured to receive, via a CAN bus, an initial control command from an ECU in the engine after the ECU is powered on.

The first transmitting module 520 is configured to control the fault detection circuit board 202 to detect initial states of the controller 200 and all devices connected to the controller 200 based on the initial control command to obtain initial state information, and transmit the initial state information to the ECU via the CAN bus.

The second transmitting module 530 is configured to receive, via the CAN bus, a first target control command from the ECU. The first target control command is transmitted by the ECU after determining that the initial state information indicates that each of the initial states of the controller and all the devices connected to the controller is a preset state.

The control module 540 is configured to control the conduction control circuit board 204 to turn on at least one MOS in the MOS array 203 based on the first target control command to output a control signal to a heater connected to the controller to control the heater to operate.

In an embodiment, the first sending module 520 is configured to control the fault detection circuit board 202 to detect the initial states of the controller 200 and all devices connected to the controller 200 based on the initial control command to obtain the initial state information by: transmitting, by using the main control circuit board 201, the initial control command to the fault detection circuit board 202; detecting, by using the fault detection circuit board 202 after receiving the initial control command, the initial states of the controller 200 and all the devices connected to the controller 200 based on a self-learning detection strategy to obtain the initial state information; and transmitting, by using the fault detection circuit board, the initial state information to the main control circuit board 201.

In an embodiment, the first transmitting module 520 is further configured to, after receiving the first target control command from the ECU via the CAN bus, transmit, by using the main control circuit board 201, the first target control command to the fault detection circuit board 202; detect, by using the fault detection circuit board 202 after receiving the first target control command, a real-time state of each of the controller 200 and the devices connected to the controller 200 to determine real-time state information of each of the controller 200 and the devices connected to the controller 200 based on a self-learning detection strategy, and continuously transmit, by using the fault detection circuit board 202, the real-time state information of the controller 200 and the devices connected to the controller 200 to the main control circuit board 201; and continuously feedback, by using the main control circuit board 201, the real-time state information of the controller 200 and the devices connected to the controller 200 to the ECU via the CAN bus.

In an embodiment, the control module 540 is configured to control the conduction control circuit board 204 to turn on at least one MOS in the MOS array 203 based on the first target control command by: transmitting the first target control command to the conduction control circuit board; and turning on, after receiving the first target control command, at least one MOS in the MOS array 203 based on the first target control command. The control module 540 is further configured to, after controlling the conduction control circuit board 204 to turn on at least one MOS in the MOS array 203, receive, via the CAN bus, a disconnection control command from the ECU, and transmit the disconnection control command to the conduction control circuit board, where the disconnection control command is transmitted by the ECU when determining that an obtained real-time temperature parameter associated with the heater 2001 reaches a historical temperature threshold corresponding to a normal start of the engine; and turn off at least one MOS corresponding to the first target control command after the disconnection control command is received.

In an embodiment, the control module 540 is further configured to, after the at least one MOS corresponding to the first target control command is turned off, continuously receive a second target control command for a target device from the ECU, and control the conduction control circuit board 204 to turn on a MOS in the MOS array 203 corresponding to the target device based on the second target control command to output a control signal to the target device to control the target device to operate. The target device includes at least one of all the devices connected to the controller 200. The second target control command is transmitted by the ECU after outputting a start command to the engine and determining that the engine is normally started.

In an embodiment, the control module 540 is further configured to: in a case that it is determined that one of the controller and the devices connected to the controller 200 is not in the preset state, add fault alarm information corresponding to the one of the controller 200 and the devices in target state information, and transmit the target state information to the main control circuit board 201, where the target state information is one of the initial state information and real-time state information; and transmit the target state information to the ECU via the CAN bus, where the ECU compares the fault alarm information in the target state information with a fault determination analysis result, and outputs alarm prompt information based on a comparison result, and the fault determination analysis result includes the fault alarm information and fault prompt information matching the fault alarm information. The preset state includes at least one of an abnormal state and a state that does not match a current control command received by the controller. The current control command includes one of the initial control command, the first target control command, and the second target control command.

In an embodiment, the self-learning detection strategy includes at least one of: detecting a first temperature of the controller 200, and determining whether the controller 200 is in the abnormal state based on the first temperature and a historical fault temperature analysis result; for each of MOSs included in the controller 200, determining a current state of the MOS and determining whether the current state of the MOS matches the current control command based on the current state of the MOS; for each of the devices connected to the controller 200, detecting a second temperature of the device, and determining whether the device is in the abnormal state based on the second temperature of the device and a temperature of the device in the historical fault temperature analysis result; and for each of the devices connected to the controller 200, detecting a current state of the device after being powered on, and determining whether the current state matches the current control command based on the current state of the device.

Figure 6:
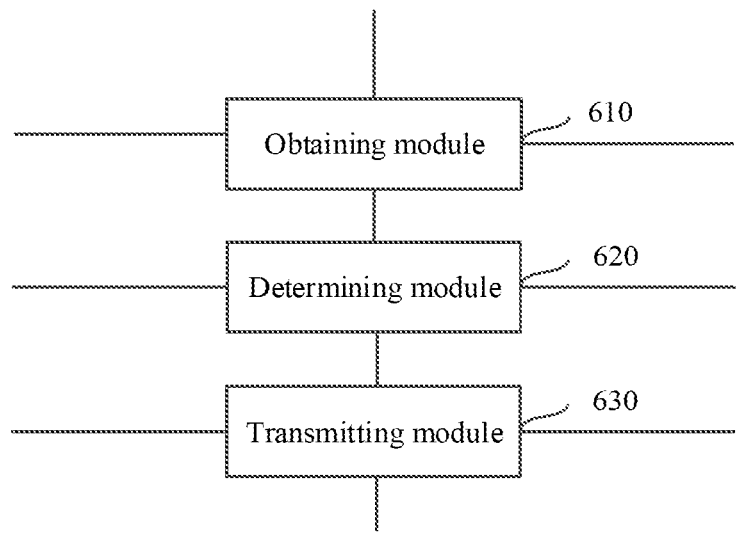
FIG. 6 is a schematic diagram showing a logic structure of a control device according to an embodiment of the present disclosure.

Based on the same concept, as shown in FIG. 6, a control apparatus is provided according to an embodiment of the present disclosure. The control apparatus is applied to an ECU in an engine. The control apparatus includes an obtaining module 610, a determining module 620 and a transmitting module 630. In one embodiment, a module is hardware (e.g., a computer processor), software, or a combination of hardware and software configured to perform the functions described herein.

The obtaining module 610 is configure to, after the ECU is powered on, obtain an initial temperature parameter, and transmit an initial control command to a controller in the engine via a CAN bus. The initial temperature parameter includes at least one of an initial ambient temperature, an initial intake air temperature, an initial water temperature and an initial oil temperature.

The determining module 620 is configured to receive, via the CAN bus, initial state information from the controller 200, and determine, after it is determined that the initial state information indicates that each of initial states of the controller and all devices connected to the controller 200 each is a preset state, a first target control command based on the initial temperature parameter and a controller application analysis result.

The transmitting module 630 is configured to transmit the first target control command to the controller 200 via the CAN bus, so that a main control circuit board 201 in the controller 200 controls a conduction control circuit board 204 in the controller 200 to turn on at least one MOS in a MOS array 203 in the controller 200 based on the first target control command to output a control signal to a heater 2001 connected to the controller 200 to control the heater 2001 to operate.

In an embodiment, the controller application analysis result includes a first calibration parameter associated with the heater, second calibration parameters associated with other devices, historical data associated with the controller and historical data associated with the heater. The historical data associated with the controller 200 includes a historical temperature threshold and a historical state of the controller 200 after the engine is normally started in the history, and the historical data associated with the heater includes a historical temperature threshold and a historical state of the heater 2001 after the engine is normally started in the history. The other devices included any devices other than the heater 2001 among all the devices connected to the controller 200. The first calibration parameter includes one or more of material of the heater 2001, a minimum intake air temperature required for engine ignition, a minimum heated intake air volume required for engine ignition, and leakage loss of intake air at a low temperature. Each of the second calibration parameters includes at least one of a voltage calibration value and a current calibration value associated with a device.

In an embodiment, for determining a first target control command based on the initial temperature parameter and a controller application analysis result, the determining module 620 is configured to: select a minimum from the initial temperature parameter as a target temperature, analyze the target temperature, the initial state information, the first calibration parameter and each historical data to determine a target quantity of heated intake air for engine ignition, and determine the first target control command for the heater based on the target quantity of heated intake air and a power of the heater.

In an embodiment, the transmitting module 630 is further configured to, after the first target control command is transmitted to the controller 200 via the CAN bus, continuously obtain a real-time temperature parameter associated with the heater 2001, where the real-time temperature parameter includes at least one of a real-time ambient temperature, a real-time intake air temperature, a real-time water temperature and a real-time oil temperature; compare the real-time temperature parameter with each of the historical data every time the real-time temperature parameter is obtained to obtain a comparison result; and transmit a disconnection control command to the controller 200 via the CAN bus when it is determined that the real-time temperature parameter reaches a historical temperature threshold corresponding to a normal start of the engine based on the comparison result.

In an embodiment, the transmitting module 630 is further configured to, after the first target control command is transmitted to the controller 200 via the CAN bus, continuously receive, real-time state information, fed back by the controller 200, of the controller 200 and real-time state information of each of the devices connected to the controller 200 via the CAN bus. The transmitting module 630 is further configured to, after the disconnection control command is transmitted to the controller 200 via the CAN bus, output a start command to the engine, and obtain a target measurement parameter of a target device after it is determined that the engine is normally started, where the target device includes at least one of all the devices connected to the controller 200, the target measurement parameter includes at least one of the real-time temperature parameter and a real-time measurement value associated with each of the other devices, and the real-time measurement value includes at least one of a real-time voltage and a real-time current of a corresponding device; analyze the target measurement parameter, a calibration parameter corresponding to the target device in the controller application analysis result, each of the historical data and real-time state information to determine a second target control command corresponding to the target device; and continuously transmit the second target control command to the controller via the CAN bus, where the controller controls the target device to operate based on the second target control command.

In an embodiment, the determining module 620 is further configured to: receive, via the CAN bus, target state information from the controller 200, where the target state information is one of the initial state information and the real-time state information; compare, after it is determined that the target state information includes fault alarm information, the fault alarm information with a fault determination analysis result, and output alarm prompt information based on a comparison result, where the fault determination analysis result includes the fault alarm information and fault prompt information matching the fault alarm information. The preset state includes at least one of an abnormal state and a state that does not match a current control command received by the controller. The current control command includes one of the initial control command, the first target control command, and a second target control command.

Figure 7:
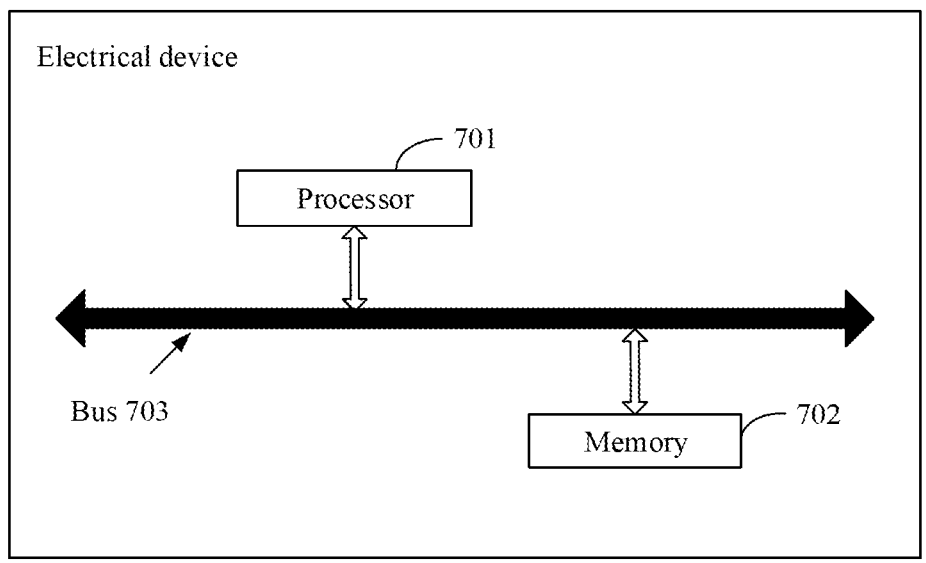
FIG. 7 is a schematic diagram showing a physical structure of an electronic device according to an embodiment of the present disclosure.

As shown in FIG. 7, an electronic device is provided according to an embodiment of the present disclosure. The electronic device includes a processor 701 and a memory 702.

The memory 702 stores a computer program executed by the processor 701. The memory 702 may be a volatile memory, such as a random-access memory (RAM). The memory 702 may be a non-volatile memory, such as a read-only memory, a flash memory, a hard disk drive (HDD) or a solid-state drive (SSD). The memory 702 may be, but is not limited to, a medium that carries or stores expected program codes in the form of instructions or data structures and can be accessed by a computer. The memory 702 may be a combination of the above memories.

The processor 701 may include one or more central processing units (CPUs), graphics processing units (GPUs) or digital processing units.

In the embodiments of the present disclosure, a medium that connects the memory 702 to the processor 701 is not limited. In FIG. 7, the memory 702 is connected to the processor 701 via a bus 703 according to the embodiment of the present disclosure, and the bus 703 is represented by a bold line. The bus 703 may include an address bus, a data bus, a control bus, and the like. For ease of representation, the bus 703 is represented only by one bold line in FIG. 7, which does not indicate that there is only one bus or only one type of bus.

The memory stores program codes. The program codes, when executed by the processor 701, cause the processor 701 to perform the control method performed by the control device (such as, the ECU or the controller) according to any one of the above embodiments.

Since the electronic device performs the control method according to the embodiments of the present disclosure, and the principle for solving problems by the electronic device is similar to the principle of the control method, the electronic device embodiments may refer to the control method embodiments, which are not repeated herein.

Based on the same concept, a computer-readable storage medium is provided according to an embodiment of the present disclosure. The computer-readable storage medium stores a computer program. The computer program, when executed by a processor, causes the processor to perform the method performed by the control apparatus according to any one of the above embodiments.

Those skilled in the art should understand that the embodiments of the present disclosure may be provided as a method, a system, or a computer program product. Therefore, the present disclosure may adopt a form of entirely hardware embodiments, entirely software embodiments, or embodiments combining hardware and software. In addition, the present disclosure may adopt a form of a computer program product implemented on one or more computer-usable storage mediums (including, but not limited to, a disk memory, a CD-ROM, and an optical memory) storing computer-usable program codes.

The present disclosure is described with reference to flow charts and/or block diagrams of the methods, apparatus (systems) and computer program products according to the embodiments. It should be understood that, each of processes in the flowcharts, and/or each of blocks in the block diagrams, and a combination of a process in the flow charts and/or a block in the block diagrams may be implemented by computer program instructions. The computer program instructions may be provided to a processor of a general-purpose computer, a special-purpose computer, an embedded processor or other programmable data processing devices to generate a machine, such that the instructions executed by the processor of the computer or the other programmable data processing devices generate a device for implementing functions specified in one or more flows in the flow charts and/or one or more blocks in the block diagrams.

The computer program instructions may also be stored in a computer-readable memory capable of guiding a computer or other programmable data processing terminal device to operate in a specific manner, so that instructions stored in the computer-readable memory generate a manufacturing product including an instruction apparatus. The instruction apparatus implements the functions specified in one or more processes in the flow charts and/or one or more blocks in the block diagrams.

The computer program instructions may be loaded on a computer or other programmable data processing devices, then the computer or other programmable devices perform operation steps to realize the processing performed by the computer, so that the instructions are executed by the computer or other programmable devices to perform functions specified in one or more flows in the flow charts and/or one or more blocks in the block diagrams.

Apparently, those skilled in the art may make various modifications and variations to the present disclosure without departing from the spirit and scope of the present disclosure. Thus, if the modifications and variations of the present disclosure fall within the scope of the claims of the present disclosure and equivalent technologies thereof, the present disclosure is intended to include the modifications and variations.

The invention claimed is:

1. A control method, wherein the control method is applied to a controller in an engine, the controller comprises a main control circuit board, a fault detection circuit board, a field-effect transistor metal-oxide-semiconductor (MOS) array, and a conduction control circuit board for controlling a MOS in the field-effect transistor MOS array to be turned on, wherein the control method comprises:
receiving, by the main control circuit board via a controller area network (CAN) bus, an initial control command from an electronic control unit (ECU) in the engine after the ECU is powered on;
controlling, by the main control circuit board based on the initial control command, the fault detection circuit board to detect initial states of the controller and all devices connected to the controller to obtain initial state information, and transmitting, by the main control circuit board via the CAN bus, the initial state information to the ECU;
receiving, by the main control circuit board via the CAN bus, a first target control command from the ECU, wherein the first target control command is transmitted by the ECU after determining that the initial state information indicates that each of the initial states of the controller and all the devices connected to the controller is a preset state; and
controlling, by the main control circuit board based on the first target control command, the conduction control circuit board to turn on at least one MOS in the MOS array to output a control signal to a heater connected to the controller to control the heater to operate.

2. The control method according to claim 1, wherein the controlling, by the main control circuit board based on the initial control command, the fault detection circuit board to detect initial states of the controller and all devices connected to the controller to obtain initial state information comprises:
transmitting, by the main control circuit board, the initial control command to the fault detection circuit board;
detecting, by the fault detection circuit board after receiving the initial control command, the initial states of the controller and all the devices connected to the controller based on a self-learning detection strategy to obtain the initial state information; and
transmitting, by the fault detection circuit board, the initial state information to the main control circuit board.

3. The control method according to claim 1, wherein after receiving, by the main control circuit board via the CAN bus, the first target control command from the ECU, the control method further comprises:
transmitting, by the main control circuit board, the first target control command to the fault detection circuit board;
after receiving the first target control command, detecting, by the fault detection circuit board based on a self-learning detection strategy, a real-time state of each of the controller and all the devices connected to the controller to determine real-time state information of each of the controller and all the devices connected to the controller, and continuously transmitting, by the fault detection circuit board, the real-time state information of the controller and all the devices connected to the controller to the main control circuit board; and
continuously feeding back, by the main control circuit board via the CAN bus, the real-time state information of the controller and all the devices connected to the controller to the ECU.

4. The control method according to claim 1, wherein the controlling, based on the first target control command, the conduction control circuit board to turn on at least one MOS in the MOS array comprises:
transmitting, by the main control circuit board, the first target control command to the conduction control circuit board; and
after receiving the first target control command, turning on, by the conduction control circuit board based on the first target control command, at least one MOS in the MOS array; and
after controlling the conduction control circuit board to turn on at least one MOS in the MOS array, the control method further comprises:
receiving, by the main control circuit board via the CAN bus, a disconnection control command from the ECU, and transmitting, by the main control circuit board, the disconnection control command to the conduction control circuit board, wherein the disconnection control command is transmitted by the ECU when determining that an obtained real-time temperature parameter associated with the heater reaches a historical temperature threshold corresponding to a normal start of the engine; and
turning off, by the conduction control circuit board after receiving the disconnection control command, the at least one MOS corresponding to the first target control command.

5. The control method according to claim 4, wherein after turning off the at least one MOS corresponding to the first target control command, the control method further comprises:
continuously receiving, by the main control circuit board, a second target control command for a target device from the ECU, and controlling, by the main control circuit board based on the second target control command, the conduction control circuit board to turn on a MOS in the MOS array corresponding to the target device to output a control signal to the target device to control the target device to operate, wherein the target device comprises at least one of all the devices connected to the controller, and the second target control command is transmitted by the ECU after outputting a start command to the engine and determining that the engine is normally started.

6. The control method according to claim 5, further comprising:
in a case that the fault detection circuit board determines that one of the controller and the devices connected to the controller is not in the preset state, adding, by the fault detection circuit board, fault alarm information corresponding to the one of the controller and the devices in target state information, and transmitting, by the fault detection circuit board, the target state information to the main control circuit board, wherein the target state information is one of the initial state information and real-time state information; and transmitting, by the main control circuit board via the CAN bus, the target state information to the ECU, wherein the ECU compares the fault alarm information in the target state information with a fault determination analysis result and outputs alarm prompt information based on a comparison result, and the fault determination analysis result comprises the fault alarm information and fault prompt information matching the fault alarm information, wherein the preset state comprises at least one of an abnormal state and a state that does not match a current control command received by the controller, and the current control command comprises one of the initial control command, the first target control command and the second target control command.

7. The control method according to claim 6, wherein a self-learning detection strategy comprises at least one of:

detecting a first temperature of the controller, and determining whether the controller is in the abnormal state based on the first temperature and a historical fault temperature analysis result;

for each of MOSs comprised in the controller, determining a current state of the MOS and determining whether the current state of the MOS matches the current control command based on the current state of the MOS;

for each of the devices connected to the controller, detecting a second temperature of the device, and determining whether the device is in the abnormal state based on the second temperature of the device and a temperature of the device in the historical fault temperature analysis result; and for each of the devices connected to the controller, detecting a current state of the device after being powered on, and determining whether the current state matches the current control command based on the current state of the device.

8. An electronic device, comprising
a memory, storing program codes; and
a processor, configured to execute the program codes to perform the control method according to claim 1.

9. A non-transitory computer-readable storage medium storing a computer program, wherein the computer program, when executed by a processor, causes the processor to perform the control method according to claim 1.

10. A control method applied to an electronic control unit (ECU) in an engine, comprising:

obtaining, by the ECU after being powered on, an initial temperature parameter, and transmitting, by the ECU via a controller area network (CAN) bus, an initial control command to a controller in the engine, wherein the initial temperature parameter comprises at least one of an initial ambient temperature, an initial intake air temperature, an initial water temperature and an initial oil temperature;

receiving, by the ECU via the CAN bus, initial state information from the controller, and determining, by the ECU after determining that the initial state information indicates that each of initial states of the controller and all devices connected to the controller is a preset state, a first target control command based on the initial temperature parameter and a controller application analysis result; and transmitting, by the ECU via the CAN bus, the first target control command to the controller, wherein a main control circuit board in the controller controls a conduction control circuit board in the controller to turn on at least one metal-oxide-semiconductor (MOS) in a MOS array in the controller based on the first target control command to output a control signal to a heater connected to the controller to control the heater to operate.

11. An electronic device, comprising
a memory, storing program codes; and
a processor, configured to execute the program codes to perform the control method according to claim 10.

12. A non-transitory computer-readable storage medium storing a computer program, wherein the computer program, when executed by a processor, causes the processor to perform the control method according to claim 10.

\* \* \* \* \*